(12) United States Patent
Cai et al.

(10) Patent No.: US 6,570,878 B2
(45) Date of Patent: *May 27, 2003

(54) NETWORK AND METHOD FOR ATM NETWORK OPERATIONS

(75) Inventors: Biaodong Cai, Plano, TX (US); Pradeep D. Samudra, Plano, TX (US)

(73) Assignee: Samsung Electronics Co., Ltd., Suwon (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/873,544

(22) Filed: Jun. 4, 2001

(65) Prior Publication Data

US 2001/0036189 A1 Nov. 1, 2001

Related U.S. Application Data

(63) Continuation of application No. 09/019,389, filed on Feb. 5, 1998, now Pat. No. 6,243,381.

(51) Int. Cl.⁷ .................................................. H04J 3/26
(52) U.S. Cl. .................. 370/392; 370/395.3; 370/397
(58) Field of Search ................................. 370/392, 395, 370/397, 399, 395.3, 395.31

(56) References Cited

U.S. PATENT DOCUMENTS 6,104,715 A    8/2000  Basso et al. ............. 370/397
6,243,381 B1 * 6/2001  Cai et al. ................ 370/392

* cited by examiner

Primary Examiner—Melvin Marcelo

(57) ABSTRACT

An asynchronous transfer mode (ATM) network and method for operating an ATM network which provides for virtual channel merging of individual user data cells. The ATM network comprises a multiplicity of source stations, wherein each one of the source stations is identified by a source identifier (SID) and is connected to at least one non-merged virtual channel (VC); a first ATM switch having a first input, a second input, and an output, such that the first input is connected to one of the non-merged virtual channels (VCs), the second input is connected to a different one of the non-merged VCs, and the output is connected to a merged VC; and at least one destination station is connected to the merged VC, which maintains a SID allocation table containing each one of the source identifiers (SIDs).

18 Claims, 4 Drawing Sheets

NETWORK AND METHOD FOR ATM NETWORK OPERATIONS

This patent application is a continuation of prior U.S. application Ser. No. 09/019,389 filed on Feb. 5, 1998 now U.S. Pat. No. 6,243,381.

FIELD OF THE INVENTION

The present invention generally relates to asynchronous transfer mode (ATM) networks and, more particularly, to ATM networks and methods for efficiently combining and transmitting information from multiple end users.

BACKGROUND OF THE INVENTION

ATM is a fast packet/cell switching technology used to transmit voice, data, image, and video signals. All broadband transmissions, whether audio, data or video, are divided into a series of fixed length cells and routed across an ATM network connected by ATM switches.

ATM technology is a connection-oriented protocol based on a standard 53-byte cell. The first five bytes carry control information and are referred to as the "header" of the ATM cell. The remaining 48 bytes carry user information or data. A virtual connection (VC) between end users must be set up before the end users can send information to each other. This is in contrast to a connectionless-oriented protocol, wherein a temporary virtual connection is established on demand when information is to be transferred.

Two of the key elements in the header of the ATM cell are known as the "Virtual Path Identifier" and the "Virtual Circuit Identifier." These are abbreviated as VPI and VCI, respectively. The VPI or VPI/VCI together "identify" an ATM cell (i.e., the address of a cell), and determine the "routing" of the cell within an ATM switch or a router. For additional information on ATM technology and details of how these fields are used to uniquely identify a cell as well as how they are used to route a cell in a switch or router, see the ITU-T or ATM Forum Standards.

ATM networks typically do not allow simultaneous transmission of high bandwidth information in a multipoint-to-multipoint two-way connection. This restricts the use of ATM networks in applications where several users would like to send and receive, simultaneously, video, image or data information and compare and contrast such information. For example, medical technology applications include situations where transmitters of information are located in different parts of the world, and receivers of information desire to compare/contrast images and video signals in real time.

Various attempts have been made to increase the amount of information which can be transmitted on a VC. Up to this point, implementations encompass the idea of a "frame merge", which interleaves traffic from different users at the frame level (rather than at the cell level). To implement a frame-merge, an ATM switch at the merge point stores incoming cells until an entire packet has arrived within the switch. The switch will then send the entire packet to the merged VC, while at the same time preventing any other user from transmitting information on the same merged VC. This approach has several disadvantages, including sophisticated channel control design requirements, extensive hardware resource requirements (e.g., buffers in the ATM switches), and the failure of this type of "store and forward" approach to carry real-time traffic. The frame-merge approach is simply impractical for real-time transmission of multimedia data over a label-switched Internet Protocol (IP) network.

Therefore, there is a need for a traffic merging network and method of operating a network that provides for merging information at less than the frame level. However, to be practical, this need must be solved by a network and method which are supported by current ATM switch hardware. Such a network and method will allow transition from current practices to the more efficient approach even before a specific operating standard is implemented. Such an approach will have many advantages over the hardware-based frame-merge solution.

SUMMARY OF THE INVENTION AND ADVANTAGES

Accordingly, the present invention provides an asynchronous transfer mode (ATM) network comprising a multiplicity of source stations, wherein each one of the source stations is identified by a source identifier (SID) and is connected to at least one non merged virtual channel (VC); a first ATM switch having a first input, a second input, and an output, such that the first input is connected to one of the non-merged virtual channels (VCs), the second input is connected to a different one of the non-merged VCs, and the output is connected to a merged VC; and at least one destination station connected to the merged VC, which maintains a SID allocation table containing each one of the source identifiers (SIDs).

The ATM network may make use of SIDs that are unique, bidirectional, and/or non-dedicated. One embodiment of the present invention may utilize no more than a single bidirectional SID.

The ATM network may further comprise the assignment of virtual channel identifiers (VCIs) to each of the source stations and into which the respective SIDs are inserted for identification of individual cell data. Another possible means of identifying the data cells is to insert the SID into a virtual path identifier (VPI) which is assigned to each one of the non-merged VCs.

The ATM network operates by having one of the source stations transmit a first data cell to a first ATM switch, and having a different source station transmit a second data cell to the first ATM switch; the first ATM switch is then used to transmit the first and second data cells to the destination station via the merged VC. The ATM network may also be constructed such that a second ATM switch is interposed between the first ATM switch and the destination station.

The present invention further provides an ATM network comprising a first and second source station, wherein the first source station is identified by a first source identifier (SID) and connected to a first non-merged VC. The ATM network also comprises a second source station which is connected to a second non-merged VC and is identified by a second SID, the first SID being different from the second SID. The ATM network also comprises a first ATM switch having a first input, a second input, and an output, such that the first input is connected to the first non-merged VC, the second input is connected to the second non-merged VC, and the output is connected to a merged VC. The ATM network further comprises a destination station connected to the merged VC; the destination station maintains a SID allocation table which contains the first and second source identifiers (SIDs). The SID allocation table may contain one or more bidirectional SIDs, and/or at least one non-dedicated SID.

This embodiment of the present invention may also contain virtual channel identifiers (VCIs) which are assigned to the first and second source stations, wherein the first SID is inserted into the VCI assigned to the first source station, and wherein the second SID is inserted into the VCI assigned to the second source station. The SIDs may also be inserted into virtual path identifiers (VPIs) which are assigned to the non-merged VCs.

This alternative embodiment of the ATM network may comprise the use of the first source station to transmit a first data cell to the first ATM switch, and the use of the second source station to transmit a second data cell to the first ATM switch, and the use of the first ATM switch to transmit the first and second data cells to the destination station via the merged VC. This embodiment of the present invention may also comprise a network in which a second ATM switch is interposed between the first ATM switch and the destination station.

Further, the present invention provides a method of operating an ATM network comprising the steps of receiving a first user data cell at a source station connected to a non-merged VC, assigning a unique SID to the source station, transmitting the first data cell to a first ATM switch via the first non-merged VC, receiving a second user data cell at a second source station connected to a second non-merged VC, assigning a unique SID to the second source station, transmitting the second data cell to the first ATM switch via the second non-merged VC, and transmitting the first and second data cells to a destination station via the merged VC.

The method of operating an ATM network may also comprise the step of inserting a unique SID into a virtual channel identifier (VCI), most preferably within the first and second assigning steps. Further, the method of operating an ATM network may be used when a second ATM switch is interposed between a first ATM switch and the destination station. The method of operating an ATM network may also comprise the step of separating the first and second data cells received from the merged VC using a SID allocation table maintained by the destination station. The SID allocation table may also contain a bidirectional SID, or a non-dedicated SID.

One advantage of the present invention is that data cells are still scheduled and queued in the same manner as is commonly effected by present hardware designs.

Another advantage of the present invention is that the ATM network and method of operation sort all ATM traffic classes, both during real-time and non-real-time data transmission.

A further advantage of the present invention is to allow user data cells from different source stations to share the same virtual channel connection and still be identifiable when they are received as merged data cells at the destination station.

Yet another advantage of the present invention is a significant reduction in the number of virtual channels required to transmit information in a label-switched Internet Protocol (IP) network, which in turn increases the scalability of label-switching technology.

DETAILED DESCRIPTION OF A PREFERRED EMBODIMENT OF THE INVENTION

In a label-switched network using ATM as the underlying data linking layer technology, VPI bit fields are used as labels for inter-domain switching and VCI bit fields are used in a similar manner for intra-domain switching. The VPI bit field typically occupies up to 12 bits of an ATM cell header. The VCI bit field normally comprises 16 bits in an ATM data cell header. Typically, the number of stations which can be identified by the VCI bit field is entirely adequate for intra-domain switching. However, most ATM switches cannot support the identification of the $2^{(12+16)}$ connections identifiable using a combined VPI/VCI designation due to hardware technology and resource limitations. That is, for label-switching and native ATM applications, the number of virtual connections (VCs) supportable by an individual ATM switching/routing device is limited by the device itself, and not the number of bits in the VPI/VCI bit fields.

The network and method of network operation provided by the present invention make use of normally unused bits provided by the VPI/VCI bit fields to provide a data cell merging capability within the network. The invention preferably comprises dividing the standard VCI bit field into two sub-fields: a VCI sub-field and a source identifier (SID) sub-field. The VCI sub-field is used to identify VC-mergeable virtual connections, and the SID sub-field is used to identify different source stations sharing a VC-mergeable connection. A switching protocol, preferably implemented in software, may be devised to assign SIDs dynamically to each source station that is in possession of user data cells for transmission through the network.

Figure 1:
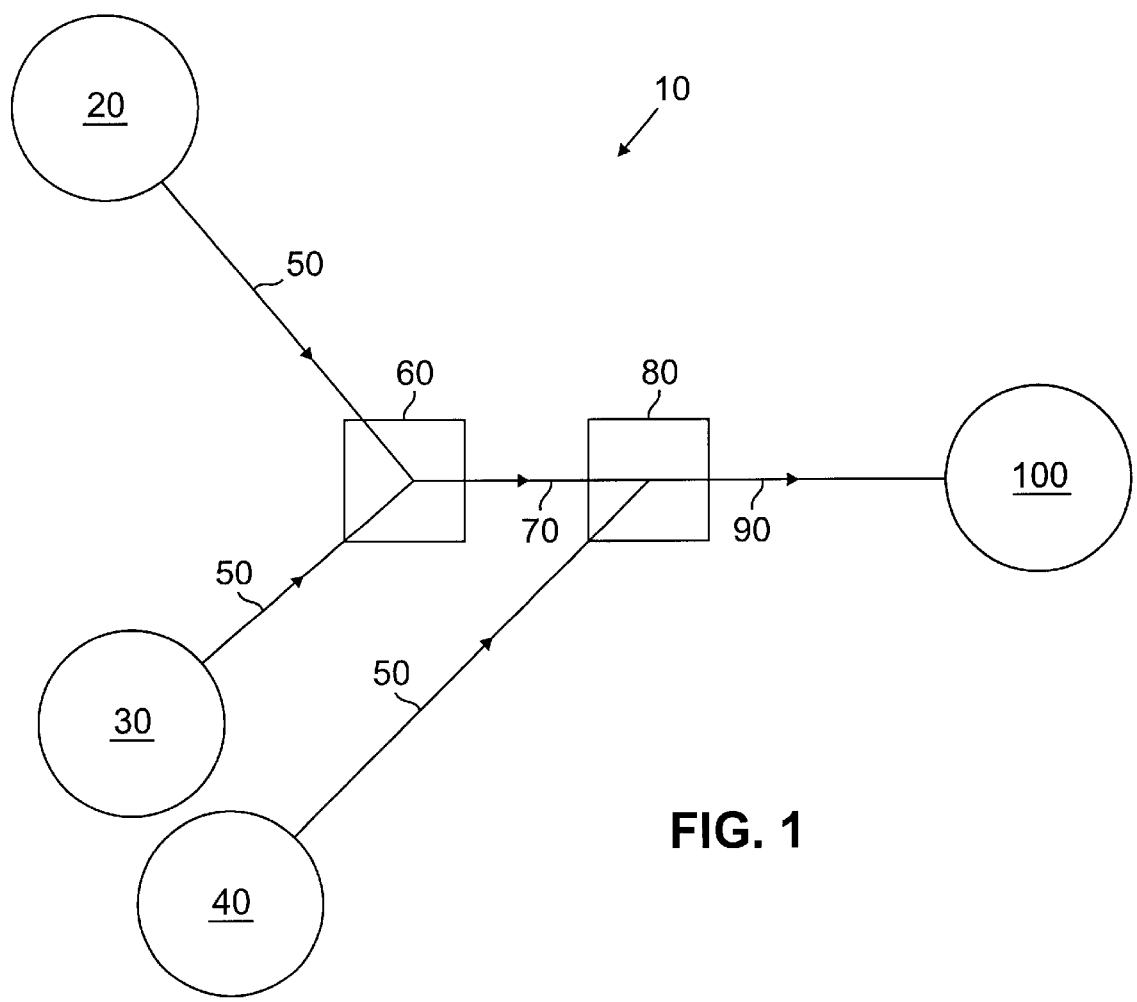
FIG. 1 depicts an ATM network according to the present invention.

The present invention generally provides an ATM network having multiple VPIs or VPI/VCIs assigned to each source station involved in a network data transaction. The present invention is disclosed by way of example, and not limitation, as illustrated in FIG. 1.

In this example, the ATM merged VC network 10 is comprised of a source station A 20, a source station B 30, a source station C 40, ATM switch A 60, an ATM switch B 80, and a destination station 100. Source stations A and B (20 and 30, respectively) are connected to two different inputs of the ATM switch 60 by way of non-merged VCs 50. The ATM switch A 60 is in turn connected to the ATM switch B 80, which is interposed between the ATM switch A 60 and the destination station 100. The ATM switch A 60 is connected to the ATM switch B 80 by way of a merged VC A 70. Additionally, source station C 40 is connected to the ATM switch B 80 by way of a non-merged VC 50. Finally, the ATM switch B 80 is connected to the destination station 100 by way of a merged VC B 90.

According to terminology more commonly used in the art, source stations A, B, and C (20, 30, and 40, respectively) are referred to as the "leaves" in a bi-directional point-to-multipoint virtual channel connection. The leaves are also referred to as ingress points of the label-switched network. IP data segmented into ATM cells flows from the source stations A, B, and C (20, 30, and 40) into the non-merged VCs 50 on their way to the destination station 100 (commonly referred to as the root or egress point of the network).

During network operation, the user data cells (not shown) are received at the source stations A, B, and C (20, 30, and 40). Once an individual source station has received a user data cell, the cell is uniquely identified and sent on to an ATM switch via a non-merged VC, where it is transmitted along with other via a merged VC to another ATM switch, or directly to a destination station. When user data cells from multiple non-merged VCs come into an ATM switch, where they are in turn transmitted over a single VC, we call the single VC a "merged VC" and the ATM switch becomes the "merge point of the merged VC", which is identified and switched according to the VCI sub-field in the user data cell header.

The SID sub-field is filled with a unique and dynamically assigned value by means of software which effects a SID Management Protocol (SMP), which is preferably, although not necessarily, resident in the destination station 100. A SID sub-field value of 0 is reserved for SMP messages and shared by all source stations A, B and C (20, 30, and 40), as well as the destination station 100. SID 0 is the only SID that carries bi-directional traffic. All other SIDs are used to carry user traffic and are uni-directional only, i.e., used for carrying user data cell traffic from the leaves of the ATM merged VC network 10 to the root.

The method of operating an ATM network normally comprises the steps of first receiving a first user data cell at a source station A 20 connected to a non-merged virtual channel 50 and then assigning a unique source identifier (SID) to the source station A 20. The SID sub-field is transparent to the ATM switches A and B (60 and 80). That is, the value of the SID is not altered by any ATM switch A or B (60 or 80). Therefore, user data cells which originate at different source stations can share the same merged VC and interleave with one another in any arbitrary way. After the unique SID has been assigned, the first data cell will be transmitted to the first ATM switch A 60 via a non-merged VC 50.

According to this example, the method of operating ATM network also comprises the steps of receiving a second user data cell at a source station B 30 connected to a non merged VC 50, assigning a unique SID to the source station B 30, and then transmitting the second user data cell to the first ATM switch A 60. At this point, the first ATM switch A 60 is used to transmit the first and second user data cells by way of the merged VC A 70 to the second ATM switch B 80, which is interposed between the first ATM switch A 60 and the destination station 100. Of course, the destination station 100 could be placed at the location of the second ATM switch B 80, being directly connected to the first ATM switch A 60 by way of the merged VC A 70. The effect of transmitting two ti cells over a merged VC is that the VPI/VCI values of the original cells will be changed to the same value, but the cells will still be sent as two separate cells.

Further, according to this example, a source station C 40 is used to receive a third user data cell, after which a unique SID is assigned to the source station C 40. The third user data cell is then transmitted to the second ATM switch B 80 by way of a non-merged VC 50, where it is in turn sent on with the first and second data cells, received at the second ATM switch B 80, to the destination station 100 via the merged VC B 90. After this transmission, the VPI/VCI values of all three cells will have the same value.

The method of operating the ATM merged VC network 10 makes use of dynamically assigned SIDs to distinguish user data cells emanating from different source stations. At each source station which connects to an ATM switch, a unique SID for that station is inserted into the SID sub-field in the data cell header before it is transmitted along with create a merged data cell.

Most preferably, the SMP described herein will require all messages to be carried in a single data cell which makes use of SID 0, shared by all of the source stations connected to an ATM switch that in turn connects to a merged VC. Because the SMP messages are carried from source to destination without software intervention, the SMP can provide real-time response. The improved performance of the ATM merged VC network is due in part to the fact that a unique SID is not assigned until the user station receives a first user data cell. This practice dramatically reduces the number of SIDs required throughout the network and leaves available more bits in the VCI sub-field.

Figure 2A:
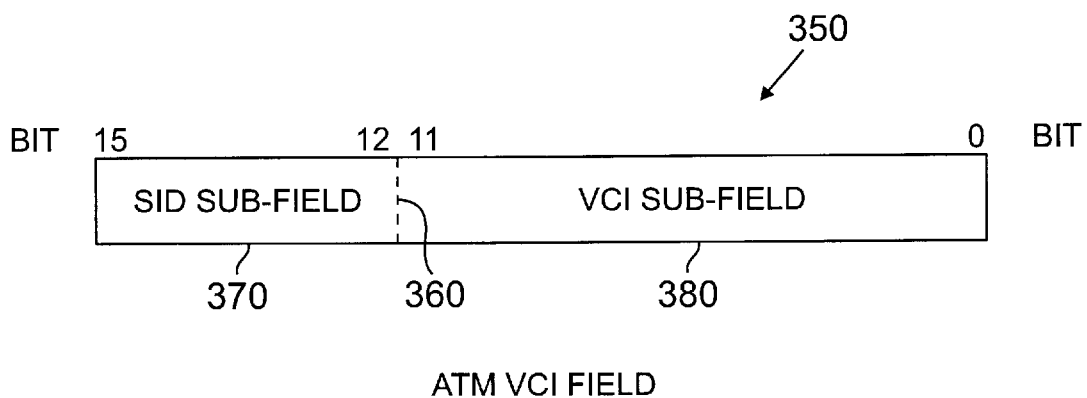
FIGS. 2A and 2B represent the division of VCI and VPI bit fields as a part of implementing the present invention.
Figure 2B:
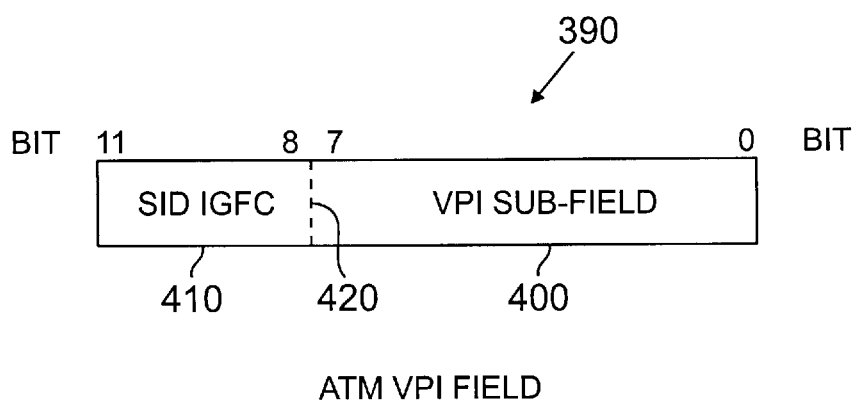

The data cell header that supports the SMP described herein will most preferably follow the standard ITU-T UNI and NNI cell header formats, with the exception of the sixteen-bit VCI field being divided into two sub-fields. Turning now to FIG. 2A, a diagram of the ATM VCI bit field 350 is shown. During the implementation of the present invention, it is most preferable to divide the ATM VCI bit field 350 into sub-fields: a SID sub-field 370 and a VCI sub-field 380. In this example, as shown in FIG. 2A, the SID sub-field 370 will take up the most significant bits of the ATM VCI field 350, while the VCI sub-field 380 will occupy the least significant bits. The VCI field divider 360 is most preferably placed between bits 11 and 12 of the sixteen bit ATM VCI field 350. However, the position of the VCI field divider 360 can be moved to other locations in the VCI bit field 350 to accommodate greater or lesser numbers of SID numeric assignments, and correspondingly lesser or greater numbers of VCI assignments. If the VCI field divider 360 is positioned as shown in FIG. 2A, then the SID sub-field 370 will occupy four bits, and the VCI sub-field 380 will occupy twelve bits. While the position of the VCI field divider 360 is variable, every node in an ATM merge VC network 10 must use the same boundary position. Establishing the location of the VCI field divider 360 can be accomplished during SMP implementation, or may be hard-wired.

To operate within the ATM merged VC network 10, the ATM switching hardware ID (i.e., ATM switch A 60 and ATM switch B 80) should satisfy the following requirements:

1. provide a software interface for fixing the location of the VCI field divider 360,
2. make use of VCI sub-fields 380, instead of conventional ATM VCI bit fields 350, for switching, policing-queuing, and scheduling ATM data cell traffic,
3. preserve the SID sub-field 370 value of each user data cell (e.g., not automatically setting the SID sub-field value to 0), and
4. when the number of ATM VCI bit field 350 data bits supported by the ATM switching hardware is less than the length of the VCI sub-field 380 specified by the SMP, then the least significant bits of the VCI sub-field 380, up to the equipment limit, should be used for identification purposes, and the unused bits of the ATM VCI sub-field 370 should be set to 0, which is consistent with the ITU-T and ATM Forum requirements. For example, if the ATM equipment recognizes only an 8-bit VCI sub-field 370, then the assigned SID will occupy the most significant four bits of the VCI bit field 350, and the unused four bits in the VCI sub-field 370 will be set to zero. Of course, if the SMP permanently fixes the location of the VCI field divider 360, no software interface for setting the location of the boundary is required.

SID assignment and management is most preferably maintained by the destination station 100 of the ATM merged VC network 10. Table 1 summarizes the values which may be assigned to SIDs:

TABLE 1

| SID VALUE | USAGE |
| --- | --- |
| 0 | Reserved for SMP messages |
| 1 | Reserved as the default SID for immediate forwarding of user data |
| 2-max | Dedicated SIDs. Each SID is dynamically assigned to a source station for transmission of user data cells |

SID 0 is reserved to carry SMP messages. SID 1 is reserved as a default SID for user data cell forwarding. Source stations that require the assignment of a SID immediately, because of system exigencies or other reasons, can use the default SID (i.e., SID 1) prior to receiving a unique SID assignment from the destination station. However, if more than one source station at a time makes use of the default SID, there is a risk that the user data packets involved will collide with each other, the information in the packets will be corrupted. The default SID is intended primarily for small data packets, such as Simple Network Management Protocol (SNMP) messages and Domain Name Service (DNS) queries. During general network operations, it is intended that unique SIDs (i.e., SID values 2 —maximum number allowed) will be assigned to source stations as needed; such SIDs will by dynamically allocated and reclaimed from each source station on an as-needed basis.

It is preferable for the destination station 100 to maintain a SID allocation table which contains the value of each SID that has been assigned to a source station, the related number of the source station to which the SID) has been assigned, and the transaction number, which records the activity of allocating the SID to the source station for error management and control purposes (i.e. to produce a more fault-tolerant system).

While several design alternatives exist with respect to how many SIDs a source station may possess within a merged-VC, only a single exemplary implementation will be explained in detail. This implementation of the present invention assumes that a first source station A, B, or C (20, 30, or 40) may possess at most one SID. This approach simplifies the required SMP design and is also safer than other approaches because it protects against the circumstance wherein a faulty source station will tie up more SIDs than are actually required to complete the transmission of information. However, this approach does not necessarily support multiple parallel data flows of the same class, over the same route, on the same merged VC. Other approaches which provide such multiple parallel data flows are described briefly hereinbelow. Assigning multiple SIDs to a single source may also be desirable to support traffic flowing from a non-VC-merged network into a VC-merged network.

An SMP used by source and destination stations in an ATM merged VC network 10, wherein SIDs are dynamically assigned and reclaimed, may be implemented using the message types shown in Table 3 below, which can each be carried in a single data cell AAL5 packet. Each message may be formatted as shown in Table 2 below:

TABLE 2

| Protocol Discriminator | Version | Source Station Identification | Transaction # |
| --- | --- | --- | --- |
| 4 octets | 2 octets | 6 octets | 4 octets |
| Message Type | | Message Type Specific Part | |
| 2 octets | | 22 octets | |

The Protocol Discriminator portion value will be assigned so that the generic message handler will be able to discriminate between messages; this number will preferably be assigned by a Standards Group. The Version number of the protocol will be 0x0001. The Source Station Identification identifies the source station to which a message is sent, or from which a message is received. A Media Access Control (MAC) address, or other universally unique hardware identifier, is recommended. A value of 0x00000000000 is used by the designation station to broadcast to all source stations. The Transaction # is a random number (i.e. not truly random, but at least non-repeating) chosen by the initiator of a message transaction; the initiator can be either a source or designation station. Finally, the Message Type Specific Part may be a null value, depending on the message type. However, the maximum length is limited to 22 octets so that the entire message can fit into a single data cell ALL5 packet. The Message Type contains one of six SMP messages as shown in Table 3.

TABLE 3

| VALUE | MESSAGE TYPE |
| --- | --- |
| 0x0000 | Reserved |
| 0x0001 | ERROR |
| 0x0002 | REQUEST |
| 0x0003 | GRANT |
| 0x0004 | RECLAIM |
| 0x0005 | RELEASE |
| 0x0006 | RELEASE ACKNOWLEDGE |
| 0x0007 | Reserved |

As is evident from Table 3, several different message types are used in the exemplary SMP. The first of these is the ERROR message, which is used by either a source or destination station to inform the receiving station that the message received contains some type of error. The ERROR message may travel in both directions, source to destination or destination to source. The format of the Message Type Specific Part can be assigned various specific values related to errors in the protocol, version, format, and system; errors in a REQUEST message; errors in a GRANT message; errors in a RECLAIM message errors; in a RELEASE message; and errors in a RELEASE ACKNOWLEDGE message. Other values in this field may be reserved for error types which may be identified in the future as the SMP becomes firmly established.

A REQUEST message is used by a source station to request a dedicated SID in order to send a user data cell on to a network switch. The direction of this message is uni-directional, i.e., source to destination, and there is no Message Type Specific Part.

The GRANT message is used by the destination station to respond to a REQUEST message for a dedicated SID. The direction of the GRANT message is uni-directional, i.e., destination to source, and the Message Type Specific Part contains the actual value of the allocated SID.

The RECLAIM message is used by the designation station to take back a previously allocated SID from a source station. It can be used in two different ways. First, it can be addressed to a specific source station to reclaim the particular SID possessed by that station. The station in this case is identified by the Source Station Identification field. Second, the RECLAIM message can also be addressed to all source stations of the merged-VC to reclaim all outstanding SIDs. A source station identification of 0×000000000000 is used to identify such a broadcast to all source stations. This use of the RECLAIM message is an efficient way to handle special events such as fault handling and re-routing of information. The direction of the RECLAIM message is uni-directional, i.e., destination to source, and the Message Type Specific Part carries the SID which is to be reclaimed; otherwise, it is set to a null value if the message is to be broadcast to all source stations.

The RELEASE message is used by a source station to release the SID it possesses, either voluntarily or due to a request by the destination station. The direction of the RELEASE message is uni-directional, i.e., source to destination, and the Message Type Specific Part contains the value of the SID possessed by the source station.

The RELEASE ACKNOWLEDGED message is used to acknowledge the voluntary release of a SID by a source station. The RELEASE ACKNOWLEDGED message direction is uni-directional, i.e., destination to source, and the Message Type Specific Part contains the value of the released SID.

Figure 3:
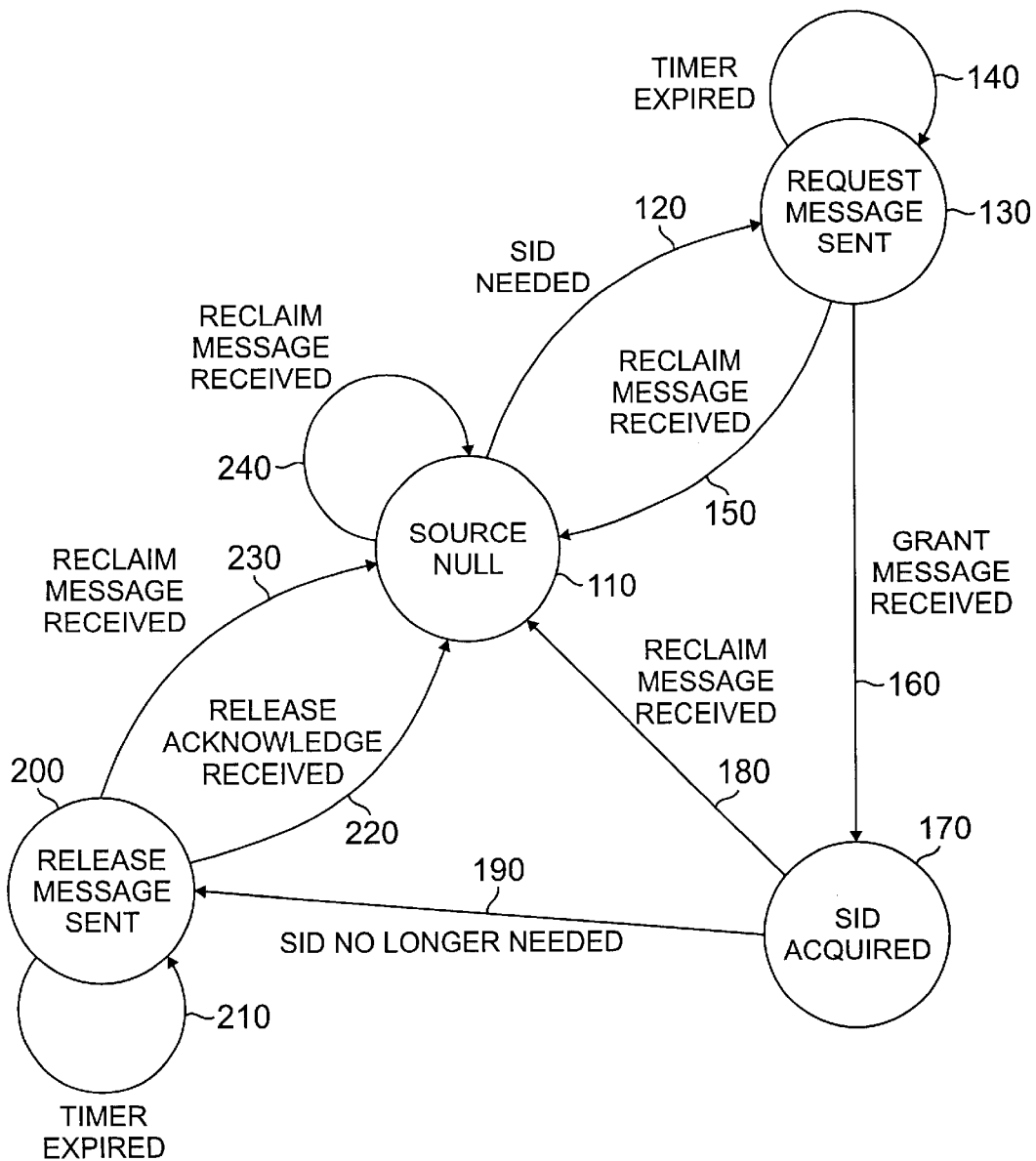
FIG. 3 depicts a state machine diagram for a source station of the present invention.

Conventional state machines may be used to implement the operation of a source and destination stations within the confines of the disclosed ATM merged VC network 10. While error handling is also a part of any network operation, it is not discussed as a part of the present invention, as it is well known in the art and many implementations currently exist which may be used within the constraints of the present invention. As can be seen in FIG. 3, a source station state machine diagram contains four states: a SOURCE NULL state 110, a REQUEST MESSAGE SENT state 130, a SID ACQUIRED state 170, and a RELEASE MESSAGE SENT state 200. Transitions between states are indicated by arrows in the figure, which represent an event (i.e., an external message received, or some condition which arises within the source station). The state transitions, including the events that trigger them, and the action taken, are defined in the following Table 4.

TABLE 4

| ORIGINAL STATE | EVENT | NEW STATE | ACTION |
| --- | --- | --- | --- |
| SOURCE NULL 110 | SID needed 120 | REQUEST SENT 130 | Send REQUEST message to the destination. Set up timer. |
| SOURCE NULL 110 | RECLAIM message received 240 | SOURCE NULL 110 | Send RELEASE message. |
| REQUEST MESSAGE SENT 130 | Timer expired 140 | REQUEST MESSAGE SENT 130 | Re-Send the REQUEST message. Set up the timer. |
| REQUEST MESSAGE SENT 130 | RECLAIM message received 150 | SOURCE NULL 110 | Send RELEASE message. |
| REQUEST MESSAGE SENT 130 | GRANT message received 160 | SID ACQUIRED 170 | Clear the timer. Inform user and control plane that the SID can be used. |
| SID ACQUIRED 170 | RECLAIM message received 230 | SOURCE NULL 110 | Send RELEASE message. Inform user and control plane that SID is reclaimed and cannot be used. |
| SID ACQUIRED 170 | No longer need SID 190 | RELEASE MESSAGE SENT 200 | Send RELEASE message. Setup timer. |
| RELEASE MESSAGE SENT 200 | Timer expired 210 | RELEASE MESSAGE SENT 200 | Re-Send RELEASE message. Set up the timer. |
| RELEASE MESSAGE SENT 200 | RECLAIM message received 230 | SOURCE NULL 110 | Clear the timer. |
| RELEASE MESSAGE SENT 200 | RELEASE ACKNOWLEDGED received 220 | SOURCE NULL 110 | Clear the timer. |

Figure 4:
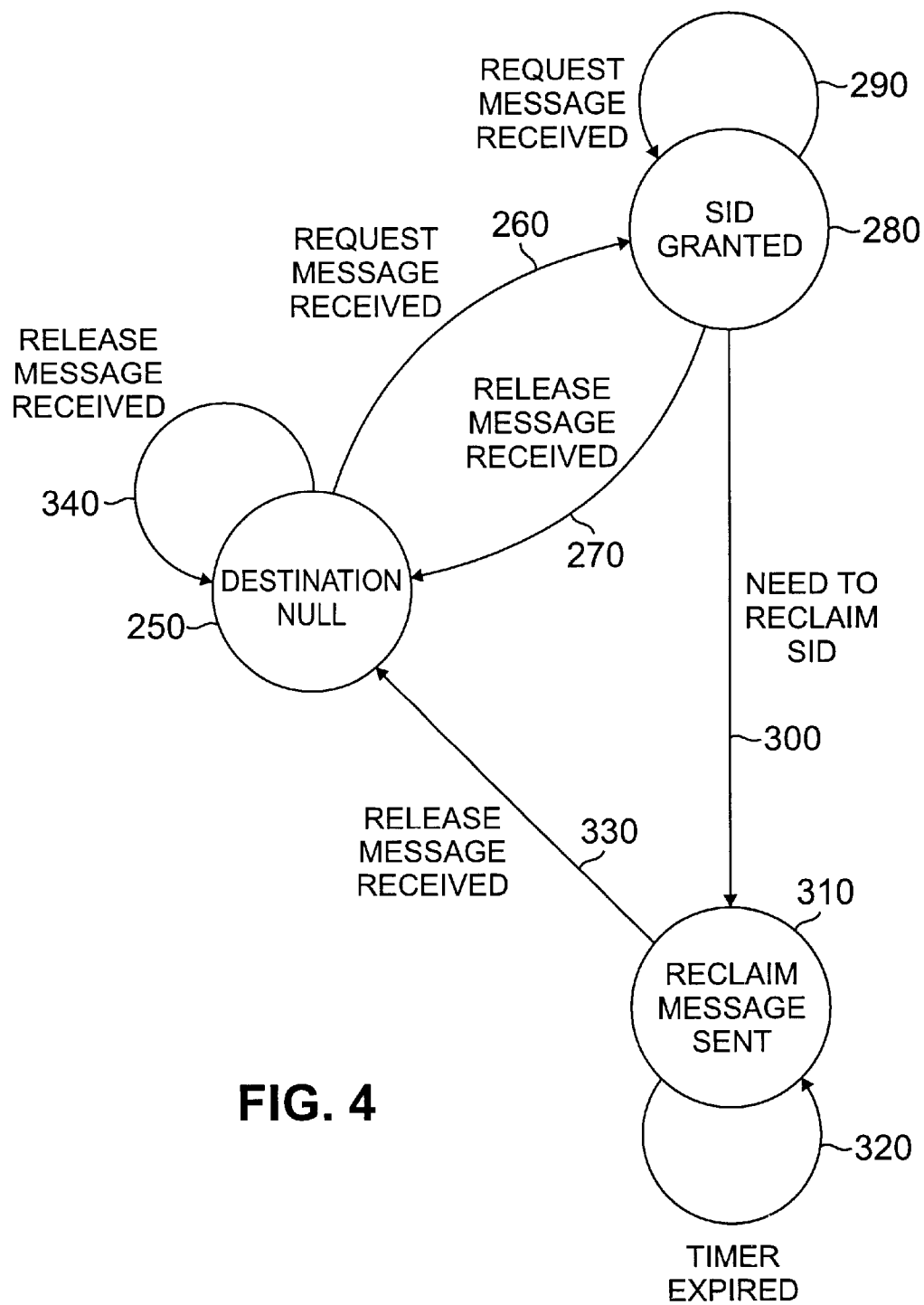
FIG. 4 presents a state machine diagram for a destination station of the present invention.

A state machine diagram for the destination station 100 can be seen in FIG. 4. This state machine is also preferably maintained within the destination station 100 and will be creed for each instance of a source station which is known to transmit user data cells to a merged VC. Each instance of the state machine is independently maintained in either of three states: a destination null state 250, a SID granted state 280, or a reclaim message sent state 310. The initial state is the destination null state 250, and subsequent transitions to other states are defined in the following Table 5.

TABLE 5

| ORIGINAL STATE | EVENT | NEW STATE | ACTION |
| --- | --- | --- | --- |
| DESTINATION NULL 250 | REQUEST message received 260 | SID GRANTED 280 | Allocate a SID, Update SAT, and send SID GRANTED message. |
| DESTINATION NULL 250 | RELEASE message received 340 | DESTINATION NULL 250 | Send RELEASE ACKNOWLEDGED message. |
| SID GRANTED 280 | REQUEST message received 290 | SID GRANTED 280 | Re-send SID GRANTED message. |
| SID GRANTED 280 | RELEASE message received 270 | DESTINATION NULL 250 | De-allocate the SID. Update SAT, and send RELEASE ACKNOWLEDGED message. |
| SID GRANTED 280 | Need to reclaim the SID 300 | RECLAIM MESSAGE SENT 310 | Send RECLAIM message. Set up a timer. |
| RECLAIM MESSAGE SENT 310 | Timer expired 320 | RECLAIM MESSAGE SENT 310 | Re-Send RECLAIM message. Set up the timer. |
| RECLAIM MESSAGE SENT 310 | RELEASE message received 330 | DESTINATION NULL 250 | De-allocate the SID. Update SAT. |

When a destination station 100 broadcasts a RECLAIM message to all source stations, the implication is that a dramatic event has occurred. All source stations receiving such a message should respond with a RELEASE message, regardless of the state that they currently maintain, in order to properly clear the SID Allocation Table maintained by the destination station 100. Any source stations not possessing a dedicated SID can simply respond with the SID 0 message.

As mentioned previously, other implementations of the SMP are possible. A source station may be allowed to possess multiple SIDs, up to a limited number. This SMP approach provides for multiple parallel data flows, which are not allowed by the exemplary SMP description. However, the SID management requirements are quite complex. Also, the SID limit is purely arbitrary and additional messages within the SMP may be required to limit negotiation within the ATM network.

In addition, each source station may be allowed to possess as many SIDs as desired, up to the total amount of SIDs available within the network. This approach can also support multiple parallel data flows of the same class over the same route on the same VC, as does the limited SID approach. However, this approach is not fault-tolerant: a faulty source station could end up hoarding all available SIDs and block data transmissions from every other source station.

Further, while it is preferred to insert the SID into the VCI field to implement the exemplary SMP, it is also possible to use the four Generic Flow Control (GFC) bits as the SID, leaving the VPI with eight bits. This approach has the disadvantage of limiting system scalability. In addition, since most interior interfaces in a label-switch network are of the Node Network Interface (NNI) type, individual implementations may suffer.

Another advantage of the present invention is that currently available ATM switching hardware does not have to be modified to support the SMP offered as an example herein.

While the invention has been particularly shown and described with reference to specific embodiments thereof, it will be understood by those skilled in the art that various changes in form and detail may be made thereto, and that other embodiments of the present invention beyond embodiments specifically described herein may be made or practiced without departing from the spirit and scope of the present invention as limited solely by the appended claims.

We claim:

1. An asynchronous transfer mode (ATM) network comprising:

a multiplicity of source stations, each said source station identified by a source identifier (SID) that is connected to at least one non-merged virtual channel (VC) and that comprises a virtual channel identifier sub-field;

at least one destination station that is connected to a merged VC and that maintains a SID allocation table containing each of said source identifiers (SIDs);

a first ATM switch that is connected to said at least one non-merged virtual channel (VC), to another non-merged virtual channel (VC), and to said merged virtual channel (VC).

2. The ATM network set forth in claim 1, wherein said SIDs are unique.

3. The ATM network set forth in claim 1, wherein one of said SIDs is bidirectional.

4. The ATM network set forth in claim 1, wherein only one of said SIDs is bidirectional.

5. The ATM network set forth in claim 1, wherein at least one of said SIDs is non-dedicated.

6. The ATM network set forth in claim 1, wherein each one of said source stations is assigned a virtual channel identifier (VCI) into which said SID is inserted.

7. The ATM network set forth in claim 1, wherein each one of said non-merged VCs is assigned a virtual path identifier (VPI) into which said SID is inserted.

8. The ATM network set forth in claim 1, wherein one of said source stations is used to transmit a first data cell to said first ATM switch, and wherein a different one of said source stations is used to transmit a second data cell to said first ATM switch, and wherein said first ATM switch is used to transmit said first and said second data cells to said destination station via said merged VC.

9. The ATM network set forth in claim 1, wherein second ATM switch is interposed between said first ATM switch and said destination station.

10. For use in an asynchronous transfer mode (ATM) network, a source station that is capable of being connected to at least one non-merged virtual channel (VC), said source station comprising an ATM transmitting device capable of transmitting IP data segmented into ATM cells into said at least one non-merged VC, wherein said source station is identified by a source identifier (SID) that comprises a virtual channel identifier sub-field.

11. The source station for use in said ATM network as set forth in claim 10, wherein said ATM network comprises at least one destination station that is connected to a merged VC and that maintains a SID allocation table containing each of said source identifiers SIDs.

12. The source station for use in said ATM network as set forth in claim 11, wherein said A TM network comprises a first ATM switch that is connected to said at least one non-merged virtual channel VC, to another non-merged virtual channel VC, and to said merged virtual channel VC.

13. The source station for use in said ATM network as set forth in claim 12, wherein said SIDs are unique.

14. The source station for use in said ATM network as set forth in claim 12, wherein one of said SIDs is bidirectional.

15. The source station for use in said ATM network as set forth in claim 14, wherein only one of said SIDs is bidirectional.

16. The source station for use in said ATM network as set forth in claim 12, wherein at least one of said SIDs is non-dedicated.

17. The source station for use in said ATM network as set forth in claim 12, wherein said source station is assigned a virtual channel identifier VCI into which said SID is inserted.

18. The source station for use in said ATM network as set forth in claim 12, wherein each one of said non-merged VCs is assigned a virtual path identifier (VPI) into which said SID is inserted.

* * * * *

UNITED STATES PATENT AND TRADEMARK OFFICE
CERTIFICATE OF CORRECTION

PATENT NO. : 6,570,878 B2
DATED : May 27, 2003
INVENTOR(S) : Biaodong Cai and Pradeep D. Samudra It is certified that error appears in the above-identified patent and that said Letters Patent is hereby corrected as shown below:

Column 5,
Line 46, delete "ti" before "cell";

Column 6,
Line 38, delete "ID" after "hardware";

Column 7,
Line 37, delete ")" after "SID";

Column 10,
Line 61, delete "creed" and replace with -- created --.

Signed and Sealed this

Thirty-first Day of January, 2006

JON W. DUDAS
*Director of the United States Patent and Trademark Office*